(12) United States Patent
Tan et al.

(10) Patent No.: US 9,548,081 B2
(45) Date of Patent: Jan. 17, 2017

(54) SYSTEMS AND METHODS FOR MULTI-TRACK MEDIA DEFECT DETECTION

(71) Applicant: Avago Technologies General IP (Singapore) Pte. Ltd., Singapore (SG)

(72) Inventors: Weijun Tan, Longmont, CO (US); Shaohua Yang, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/602,087

(22) Filed: Jan. 21, 2015

(65) Prior Publication Data

US 2016/0210996 A1     Jul. 21, 2016

(51) Int. Cl.
| | |
|---|---|
| *G11B 20/18* | (2006.01) |
| *G11B 20/12* | (2006.01) |
| *G11B 20/10* | (2006.01) |
| *G11B 19/04* | (2006.01) |
| *G11B 7/09* | (2006.01) |
| *G11B 5/012* | (2006.01) |
| *G11B 7/131* | (2012.01) |
| *G11B 7/0037* | (2006.01) |

(52) U.S. Cl.
CPC ......... *G11B 20/1816* (2013.01); *G11B 7/0948* (2013.01); *G11B 19/048* (2013.01); *G11B 20/10046* (2013.01); *G11B 20/1252* (2013.01); *G11B 20/1889* (2013.01); *G11B 5/012* (2013.01); *G11B 7/0037* (2013.01); *G11B 7/131* (2013.01); *G11B 2020/1826* (2013.01)

(58) Field of Classification Search
None
See application file for complete search history.

(56) References Cited

U.S. PATENT DOCUMENTS

| | | | |
|---|---|---|---|
| 6,496,943 | B1 | 12/2002 | Belser et al. |
| 6,628,465 | B2 | 9/2003 | Yong |
| 8,014,245 | B2 * | 9/2011 | Chen et al. ............... 369/53.17 |
| 2002/0118473 | A1 * | 8/2002 | Yong ............................ 360/31 |
| 2007/0146921 | A1 | 6/2007 | Jun |
| 2010/0226033 | A1 * | 9/2010 | Tan ....................... G11B 5/09 360/53 |

* cited by examiner

*Primary Examiner* — Brian Butcher (57) ABSTRACT

Systems, methods, devices, circuits for data processing, and more particularly to systems and methods for data processing to identify a defect on a medium.

20 Claims, 6 Drawing Sheets

SYSTEMS AND METHODS FOR MULTI-TRACK MEDIA DEFECT DETECTION

FIELD OF THE INVENTION

Systems, methods, devices, circuits for data processing, and more particularly to systems and methods for data processing to identify a defect on a medium.

BACKGROUND

Manufacturing the storage medium includes performing a variety of steps any of which can result in a defective region on the storage medium. Further, defective regions may develop over the time that the storage medium is used. Writing data to a defective region can result in the loss of such data. To avoid this, some approaches have been developed to identify defective regions as unusable. This works reasonably well, but is not able to consistently identify short and shallow defects on a storage medium, especially for random sequences.

Hence, for at least the aforementioned reasons, there exists a need in the art for advanced systems and methods for identifying defects on a storage medium.

SUMMARY

Systems, methods, devices, circuits for data processing, and more particularly to systems and methods for data processing to identify a defect on a medium.

Some embodiments provide media defect detection systems that include: a media defect detector circuit, and a multi-track defect combining circuit. The media defect detector circuit is operable to: generate a first defect indicia for a location on a first track of a storage medium, and generate a second defect indicia for a location on the second track of the storage medium, where the location on the second track corresponds to the location on the first track. The multi-track defect combining circuit is operable to generate a media defect signal based upon both the first defect indicia and the second defect indicia.

This summary provides only a general outline of some embodiments of the invention. The phrases "in one embodiment," "according to one embodiment," in various embodiments", in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems, methods, devices, circuits for data processing, and more particularly to systems and methods for data processing to identify a defect on a medium.

Some embodiments provide media defect detection systems that include: a media defect detector circuit, and a multi-track defect combining circuit. The media defect detector circuit is operable to: generate a first defect indicia for a location on a first track of a storage medium, and generate a second defect indicia for a location on the second track of the storage medium, where the location on the second track corresponds to the location on the first track. The multi-track defect combining circuit is operable to generate a media defect signal based upon both the first defect indicia and the second defect indicia. In some cases, the system is implemented as part of an integrated circuit.

In some instances of the aforementioned embodiments, the media defect detector circuit includes: a first defect detector circuit operable to: receive data from the first track, and generate the first defect indicia; and a second defect detector circuit operable to: receive data from the second track, and generate the second defect indicia. In some such instances, the first defect detector circuit is separate and identical to the second defect detector circuit.

In one or more instances of the aforementioned embodiments, the first defect indicia includes a first division product and a first low pass filtered value each generated based upon data from the first track; and the second defect indicia includes a second division product and a second low pass filtered value each generated based upon data from the second track. In some such instances, the multi-track defect combining circuit includes a first multiplier circuit operable to multiply the first division product and the second division product to yield a first product, and a second multiplier circuit operable to multiply the first low pass filtered value and the second low pass filtered value to yield a second product. In various cases, the second multiplier circuit is further operable to multiply by a media defect threshold to yield the second product. In such cases, the multi-track defect combining circuit includes a slicer circuit operable to assert the media defect signal based upon a combination of the first product and the second product. The media defect threshold may be either fixed or programmable.

In some instances of the aforementioned embodiments, the first defect indicia is generated in parallel to the second defect indicia. In one or more instances of the aforementioned embodiments, the first defect indicia is generated at a time prior to generation of the second defect indicia.

In particular instances of the aforementioned embodiments, the system is implemented as part of a storage device, and wherein the storage device includes the storage medium. In some such instances, the storage device further includes a read/write head assembly disposed in relation to the storage medium such that a first read head accesses data from the first track in parallel to a second read head accessing data from the second track. In some cases, the storage device further includes a read/write head assembly disposed in relation to the storage medium such that a read head accesses data from the first track prior to accessing data from the second track.

Other embodiments of the present invention provide methods for identifying media defects on a storage medium that include: accessing a first data set from a first track of a storage medium; accessing a second data set from a second track on the storage medium; generating a first defect indicia for a location on the first track based upon the first data set; generating a second defect indicia for a location on the second track based upon the second data set, where the location on the second track corresponds to the location on the on the first track; and generating a media defect signal based upon both the first defect indicia and the second defect indicia.

Figure 1A:
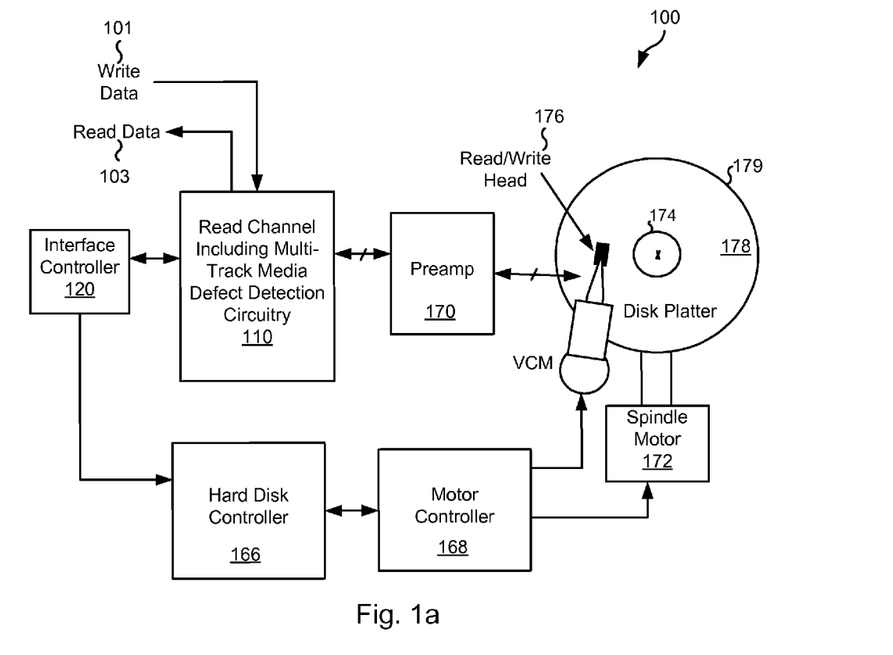
FIG. 1a shows a storage system including multi-track media defect detection circuitry in accordance with some embodiments of the present invention.

Turning to FIG. 1a, a storage system 100 including a read channel circuit 110 having multi-track media defect detection circuitry in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme. The data on disk platter 178 is stored as tracks that are located between an inner diameter 174 and an outer diameter 179.

In a typical read operation, read/write head assembly 176 is accurately positioned by motor controller 168 over one or more tracks on disk platter 178. Read/write head assembly 176 includes one or more read heads capable of sensing data from the tracks. Where two or more read heads are included on read/write head assembly 176, data from two or more tracks can be sensed at a time. Alternatively, where the multiple read heads are disposed above the same track and/or read/write head assembly 176 includes only a single read head, data from multiple read tracks is received in series as read/write head assembly 176 is sequentially moved over the respective tracks.

Figure 1B:
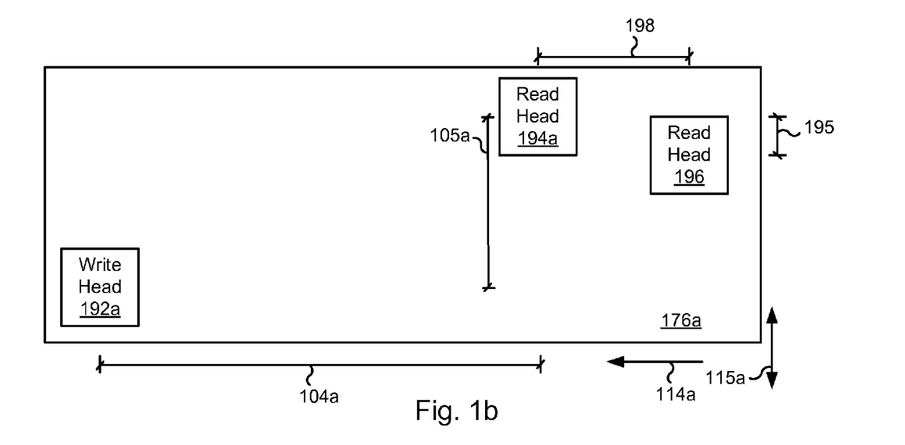
FIG. 1b shows an example distribution of two read heads and a write head disposed as part of a read/write head assembly that may be used in relation to various embodiments of the present invention.

Turning to FIG. 1b, an example of read/write head assembly 176 is shown (shown as read/write head assembly 176a) that includes two read heads 194a, 196 that are physically separated in a down track direction 114a by a distance 198, and in a cross track direction 115a by a distance 195. Read/write head assembly 176a moves over the surface of a storage medium (e.g., disk platter 178) in down track direction 114a as it is sensing data from a given track. As read/write head assembly 176a is moved between tracks it is moved in cross track direction 115a. Each of read heads 194a, 196 are capable of sensing information from disk platter 178. In addition, read/write head assembly 176a includes a write head 192a that is capable of writing data to disk platter 178. It should be noted that distances 195, 198 between read heads 194a, 196 and distances 104a, 105a between read heads 194a, 196 and write head 192a are not drawn to proportion. As an example, distance 198 may be on the order of 100 nm, and distance 104a may be between 2-5 μm. Distance 195 may be less than the width of a track on disk platter 178, and distance 105a may be, for example, on the order of one hundred (100) track widths. Thus, FIG. 1b is intended to show the specific elements included in read/write head assembly, but the drawing is grossly out of proportion.

Figure 1C:
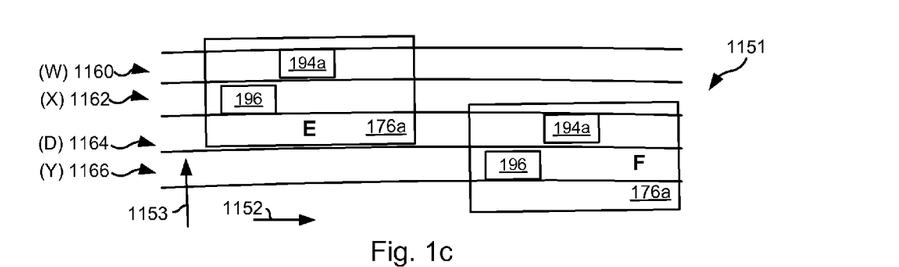
FIG. 1c shows an example orientation of a multiple read head read/write head assembly relative to multiple tracks on a storage medium.

Turning to FIG. 1c, an example orientation 1151 of a multiple read head read/write head 176a assembly relative to multiple tracks 1160 (storing "W" Data), 1162 (storing "X" Data), 1164 (storing "D" Data), 1166 (storing "Y" Data) on a storage medium is shown. As shown, read/write head assembly 176a traverses disk platter 178 in a down track direction 1152 and a cross track direction 1153. Read write head assembly 176a is shown twice—once in a position labeled E and the other in a position labeled F. Position labeled E shows the cross-track location of read/write head assembly 176a during one rotation of disk platter 178, and position labeled F shows the cross-track location of read/write head assembly 176a during a subsequent rotation of disk platter 178. Orientation 1151 includes tracks 1160, 1162, 1164, 1166 in a region between outside diameter 179 and inside diameter 174 where a skew angle results in read head 194a being reasonably centered on one track and read head 196 being reasonably centered on the next track. As shown, in these tracks, the read heads fit well across separated tracks. In this situation, two tracks are processed together without buffering.

Figure 1D:
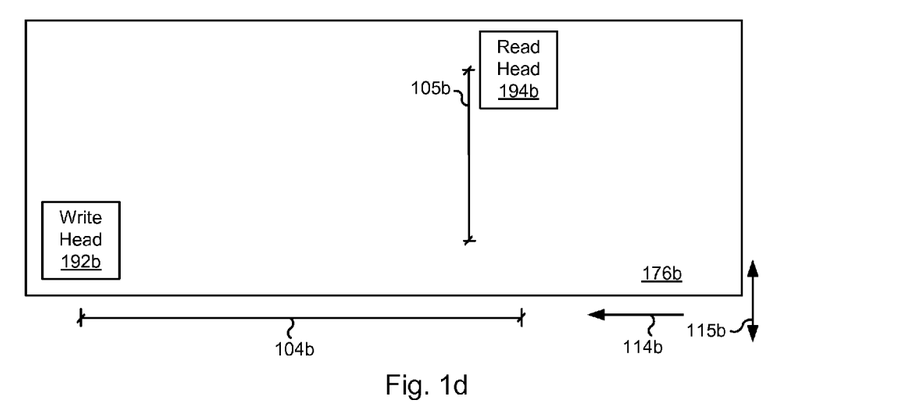
FIG. 1d shows an example distribution of a read head and a write head disposed as part of a read/write head assembly that may be used in relation to various embodiments of the present invention.

Turning to FIG. 1d, an example of read/write head assembly 176 is shown (shown as read/write head assembly 176b) that includes a single read head 194b. Read/write head assembly 176b moves over the surface of a storage medium (e.g., disk platter 178) in down track direction 114b as it is sensing data from a given track. As read/write head assembly 176b is moved between tracks it is moved in cross track direction 115b. Read head 194b is capable of sensing information from disk platter 178. In addition, read/write head assembly 176b includes a write head 192b that is capable of writing data to disk platter 178. Distance 104b may be, but is not limited to, between 2-5 μm; and distance 105b may be, but is not limited to, one hundred (100) track widths. Thus, FIG. 1d is intended to show the specific elements included in read/write head assembly, but the drawing is grossly out of proportion.

Figure 1E:
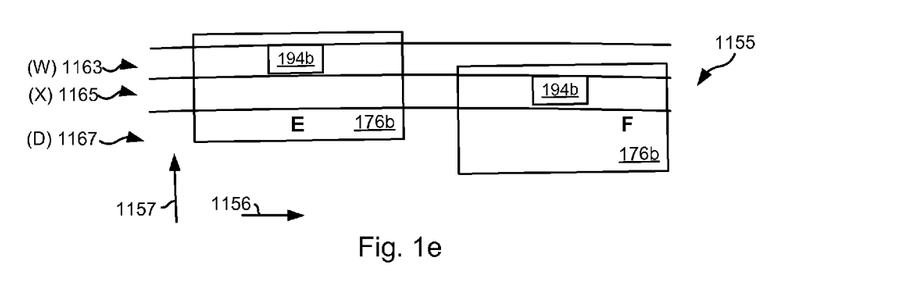
FIG. 1e shows an example orientation of a single read head read/write head assembly relative to tracks on a storage medium.

Turning to FIG. 1e, an example orientation 1155 of a single read head read/write head 176 assembly relative to multiple tracks 1163 (storing "W" Data), 1165 (storing "X" Data), 1167 (storing "D" Data) on a storage medium is shown. As shown, read/write head assembly 176b traverses disk platter 178 in a down track direction 1156 and a cross track direction 1157. Read write head assembly 176 is shown twice—once in a position labeled E and the other in a position labeled F. Position labeled E shows the cross-track location of read/write head assembly 176 during one rotation of disk platter 178, and position labeled F shows the cross-track location of read/write head assembly 176 during a subsequent rotation of disk platter 178. Orientation 1155 includes tracks 1163, 1165, 1167 in a region between outside diameter 179 and inside diameter 174 where a skew angle results in read head 194 being reasonably centered on one track. As shown, in these tracks, the read heads fit well across separated tracks. In this situation, a single track is processed on a given rotation of the storage medium.

Referring again to FIG. 1a, motor controller 168 both positions read/write head assembly 176 in relation to disk platter 178 and drives spindle motor 172 by moving read/write head assembly 176 to the proper data track on disk platter 178 under the direction of hard disk controller 166. Spindle motor 172 spins disk platter 178 at a determined angular velocity (RPMs) that remains substantially constant. The linear velocity (m/s) at which spindle motor 172 moves varies based upon radial distance of read/write head 176 from the center point of disk platter 178 for the track of interest. To make the size of data locations on disk platter 178 similar between inner diameter 174 and outer diameter 179 of disk platter 178, the linear velocity of disk platter 178 may be increased as read/write head assembly 176 moves from inner diameter 174 toward outer diameter 179 of disk platter 178. This linear velocity information 173 is provided to the radial location estimating circuitry of read channel circuit 110.

Once read/write head assembly 176 is positioned adjacent to a desired track of disk platter 178 (e.g., track 155), magnetic signals representing data on the track are sensed by read/write head assembly 176 as disk platter 178 is rotated by spindle motor 172. The stream of sensed magnetic signals are provided as a continuous analog signal representative of the magnetic data on the track of disk platter 178. This stream of analog signals is transferred from read/write head assembly 176 to read channel circuit 110 via preamplifier 170. Preamplifier 170 is operable to amplify the analog signals accessed from disk platter 178. In turn, read channel circuit 110 decodes and digitizes the received analog signals to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read of data from disk platter 178, data is received from the one or more read heads incorporated on read/write head assembly 176. Data from multiple tracks is used to identify any media defects on disk platter 178. As some examples, the media defect detection may be done using a circuit similar to one of the circuits discussed below in relation to FIG. 3, 4 or 7, and/or may be done in accordance with one of the methods discussed below in relation to FIG. 6 or 8.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
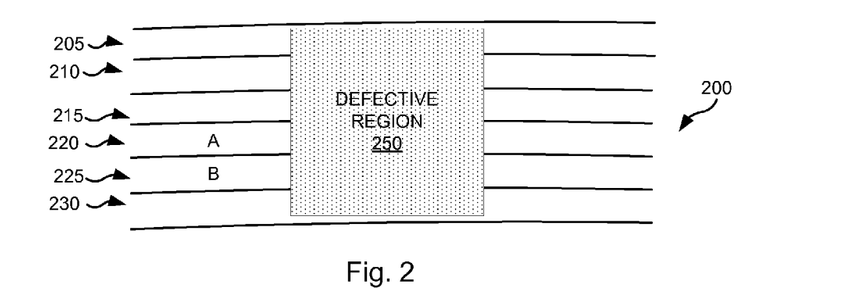
FIG. 2 shows a defective region on a storage medium extending across a number of tracks of the storage medium.

Turning to FIG. 2, a defective region 250 on a storage medium 200 is shown that extends across a number of tracks of storage medium 200. In particular, defective region 250 extends across tracks 205, 210, 215, 220, 225, 230.

Figure 3:
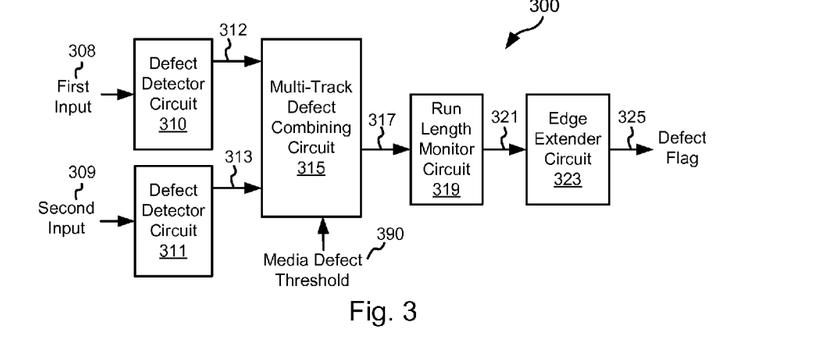
FIG. 3 depicts a multi-track defect detection circuit in accordance with some embodiments of the present invention.

Turning to FIG. 3, a multi-track defect detection circuit 300 is shown in accordance with some embodiments of the present invention. Multi-track defect detection circuit 300 includes a defect detector circuit 310 that receives a first input 308. First input 308 is derived from a first read head (not shown) disposed over a first track of a storage medium (not shown). Media defect detector circuit 310 applies a medium defect detection algorithm to the information derived from the first track to yield a defect value 312. Defect value 312 is indicative of a likelihood of a defect on the storage medium at the location to which first input 308 corresponds. Additionally, multi-track defect detection circuit 300 includes a defect detector circuit 311 that receives a second input 309. Second input 309 is derived from a second read head (not shown) disposed over a second track of the storage medium (not shown). Media defect detector circuit 311 applies a medium defect detection algorithm to the information derived from the second track to yield a defect value 313. Defect value 313 is indicative of a likelihood of a defect on the storage medium at the location to which second input 309 corresponds.

The location of second input 309 and first input 308 at a given time correspond to different tracks (i.e., at different radial diameters) on the storage medium, but at substantially the same location on the tracks. Thus, using FIG. 2 as an example, defect value 312 may correspond to a location A on track 220 at the time that defect value 313 corresponds to a location B on track 225. Any circuit known in the art for detecting a media defect based upon information received from a given track on a storage medium may be used to implement defect detector circuit 310 and defect detector circuit 311. As just some examples, one of the media defect detectors disclosed in U.S. Pat. No. 8,516,348 entitled "Systems and Methods for Enhanced Media Defect Detection" and filed Jun. 13, 2012 may be used in relation to some embodiments of the present invention. The entirety of the aforementioned reference is incorporated herein by reference for all purposes. Based upon the disclosure provided herein, one of ordinary skill in the art will recognize a variety of different media defect detector circuits that may be used in relation to different embodiments of the present invention.

Defect value 312 and defect value 313 are provided to a multi-track defect combining circuit 315. Multi-track defect combining circuit 315 combines defect value 312 with defect value 313 to yield a combined defect value. Multi-track defect combining circuit 315 compares the combined defect value with a media defect threshold 390. In some cases, media defect threshold 390 may be user programmable. In other cases, media defect threshold 390 is fixed. Where the combined defect value is less than media defect threshold 390, multi-track defect combining circuit 315 asserts a defect flag 317.

Defect flag 317 is provided to a run length monitor circuit 319 that requires assertion of defect flag 317 for a programmable threshold number of cycles before a defect is indicated. Once a defect is indicated by run length monitor 319 as a filtered defect output 321, an edge extender circuit 323 marks the beginning and end of a corresponding defective region using a programmable right extension value and a programmable left extension value with the resulting edge extended defect flag 325 being provided as an output. Run length monitor 319 and edge extender circuit 323 may be implemented similar to that disclosed in U.S. Pat. No. 7,849,385 entitled "Systems and Methods for Media Defect Detection Utilizing Correlated DFIR and LLR Data", and filed Apr. 29, 2008 by Tan et al. The entirety of the aforementioned reference is incorporated herein by reference for all purposes.

Figure 4:
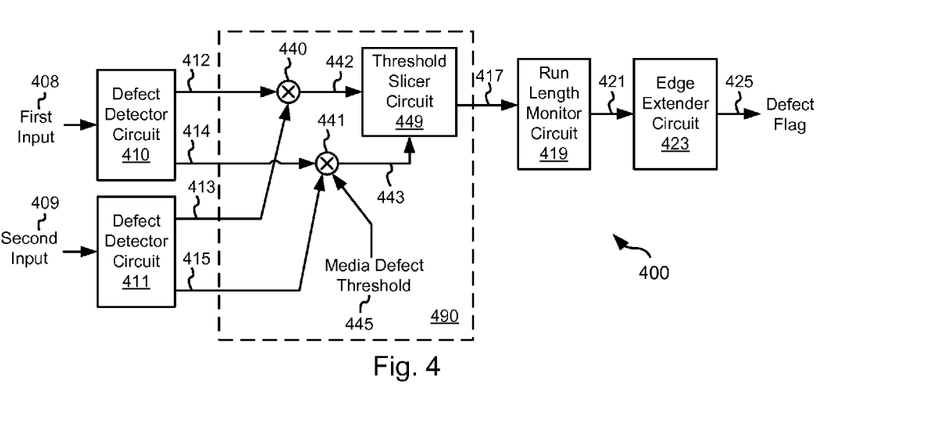
FIG. 4 shows a particular implementation of a multi-track defect detection circuit in accordance with various embodiments of the present invention.

Turning to FIG. 4, a particular implementation of a multi-track defect detection circuit 400 is depicted in accordance with various embodiments of the present invention. Multi-track defect detection circuit 400 includes a defect detector circuit 410 that receives a first input 408. First input 408 is derived from a first read head (not shown) disposed over a first track of a storage medium (not shown). Media defect detector circuit 410 applies a medium defect detection algorithm to the information derived from the first track to yield a first defect indicia 412 and a second defect indicia 414. Defect indicia 412, 414 are indicative of a likelihood of a defect on the storage medium at the location to which first input 408 corresponds. Additionally, multi-track defect detection circuit 400 includes a defect detector circuit 411 that receives a second input 409. Second input 409 is derived from a second read head (not shown) disposed over a second track of the storage medium (not shown). Media defect detector circuit 411 applies a medium defect detection algorithm to the information derived from the second track to yield a first defect indicia 413 and a second defect indicia 415. Defect indicia 413, 415 are indicative of a likelihood of a defect on the storage medium at the location to which second input 409 corresponds.

The location of second input 409 and first input 408 at a given time correspond to different tracks (i.e., at different radial diameters) on the storage medium, but at substantially the same location on the tracks. Thus, using FIG. 2 as an example, defect indicia 412, 414 may correspond to a location A on track 220 at the time that defect indicia 413, 415 correspond to a location B on track 225. Again, as with the circuit described above in relation to FIG. 3, any circuit known in the art for detecting a media defect based upon information received from a given track on a storage medium may be used to implement defect detector circuit 410 and defect detector circuit 411. Based upon the disclosure provided herein, one of ordinary skill in the art will recognize a variety of different media defect detector circuits that may be used in relation to different embodiments of the present invention.

Defect indicia 412 is of similar type to defect indicia 413, and defect indicia 414 is of similar type to defect indicia 415. All of defect indicia 412, 413, 414, 415 are provided to a multi-track defect combining circuit 490. Multi-track defect combining circuit 490 includes a first multiplier circuit 440, a second multiplier circuit 441, and a data slicer circuit 449. Multiplier circuit 440 multiplies defect indicia 412 from defect detector circuit 410 (i.e., a defect indicia corresponding to a first track on a storage medium) by defect indicia 413 from defect detector circuit 411 (i.e., a defect indicia corresponding to a second track on a storage medium) to yield a first product 442. Multiplier circuit 441 multiplies defect indicia 413 from defect detector circuit 410 (i.e., a defect indicia corresponding to a first track on a storage medium) by defect indicia 415 from defect detector circuit 411 (i.e., a defect indicia corresponding to a second track on a storage medium) and by a media defect threshold value 445 to yield a second product 443. In some cases, media defect threshold 445 may be user programmable. In other cases, media defect threshold 445 is fixed.

First product 442 and second product 443 are provided to a threshold slicer circuit 449 as is known in the art. Where the combination of first product 442 and second product 443 indicate a media defect, threshold slicer circuit 449 asserts defect flag 417. In other embodiments, slicer circuit 449 is replaced by a comparator circuit. In such a case, multiplier circuit 441 provides second product 443 as defect indicia 414 and defect indicia 415. The comparator compares a combination of first product 442 and second product 443 (e.g., first product 442 added to second product 443) to media defect threshold 445. Where the combination is less than media defect threshold 445, the comparator circuit asserts defect flag 417. In yet other cases, the comparator circuit compares first product 442 with a first threshold value and second product 443 with a second threshold. Where the comparison is less than both thresholds, defect flag 417 is asserted.

Defect flag 417 is provided to a run length monitor circuit 419 that requires assertion of defect flag 417 for a programmable threshold number of cycles before a defect is indicated. Once a defect is indicated by run length monitor 419 as a filtered defect output 421, an edge extender circuit 423 marks the beginning and end of a corresponding defective region using a programmable right extension value and a programmable left extension value with the resulting edge extended defect flag 425 being provided as an output. Run length monitor 419 and edge extender circuit 423 may be implemented similar to that disclosed in U.S. Pat. No. 7,849,385 entitled "Systems and Methods for Media Defect Detection Utilizing Correlated DFIR and LLR Data", and filed Apr. 29, 2008 by Tan et al. The entirety of the aforementioned reference was previously incorporated herein by reference for all purposes.

Figure 5:
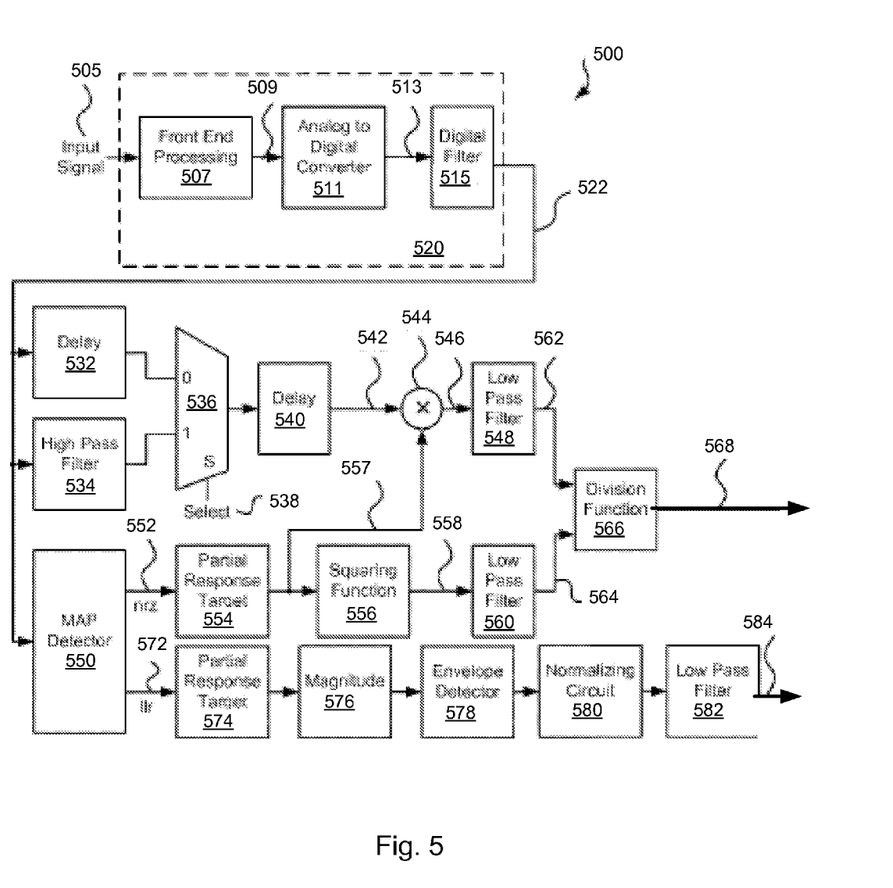
FIG. 5 shows one embodiment of a defect detector circuit that may be used in relation to embodiments of the present invention.

Turning to FIG. 5, a block diagram depicts a media defect detector circuit 500 that may be used in relation to embodiments of the present invention. Defect detector circuit 500 receives a series of data samples 522. Data samples 522 are derived from a storage medium (not shown) via an input signal 505 provided to an input circuit 520. Input circuit 520 receives input signal 505 that is an analog signal representing data sensed from the storage medium. A front end processing circuit 507 applies, among other things, amplification and/or analog filtering to input signal 505 and provides an analog signal 509 to an analog to digital converter 511. Analog to digital converter 511 samples analog signal 509 at a sampling rate and provides a series of digital samples 513. Digital samples 513 are filtered using a digital filter 515 that provides data samples 522. In some cases, digital filter 515 is a ten tap digital finite impulse response filter as is known in the art.

A MAP data detector 550 performs a maximum a posteriori data detection on data samples 522 as is known in the art. MAP data detector 550 provides both a hard output (nrz) 552 and a soft output (llr) 572. Hard output 552 is a series of determined values for each bit period of the input bit stream, and the corresponding soft output 572 indicates a likelihood that the respective hard output 552 is correctly determined. In some embodiments of the present invention, hard output 552 is either a logic '1' or a logic '0', and soft output 572 is a log-likelihood ratio representing the probability that the corresponding hard output 552 is accurate. In one case, soft output 572 is a value between negative thirty-two and positive thirty-two with the lowest value corresponding to the lowest probability and the highest value corresponding to the highest probability.

Hard output 552 is provided to a partial response target filter 554. In some cases, partial response target filter 554 is a two tap digital finite impulse response filter as is known in the art. Based upon the disclosure provided herein, one of ordinary skill in the art will recognize other partial response target filters that may be used in relation to different embodiments of the present invention. A partial response output 557 is provided to a squaring function 556 to create a squared output 558 (i.e., $f(x)=x^2$). Squared output 558 is provided to a low pass filter 560 that in turn provides a low pass filtered signal 564. Low pass filter 560 may be any low pass filter known in the art. In one particular embodiment, low pass filter 560 is a thirty-two bit MA filter as are known in the art. In addition, partial response output 557 is provided to a multiplier circuit 544.

Soft output 572 is provided to a partial response target filter 574. In some cases, partial response target filter 574 is a two tap digital finite impulse response filter as is known in the art. Based upon the disclosure provided herein, one of ordinary skill in the art will recognize other partial response target filters that may be used in relation to different embodiments of the present invention. The output of partial response target filter 574 is provided to a magnitude function 576 that returns the absolute value of the output from partial response target filter 574. The magnitude output is provided to an envelope detector 578. Envelope detector 578 may be any envelope detector known in the art. In one case, envelope detector 578 may be implemented similar to that disclosed in U.S. Pat. No. 8,139,457 entitled "Systems and Methods for Low Latency Media Defect Detection", and filed Sep. 23, 2008 by Cao et al. The entirety of the aforementioned reference is incorporated herein by reference for all purposes. In one particular embodiment of the present invention, envelope detector 578 operates in accordance with the following pseudocode:

```
If (magnitude_i > magnitudei-1){
    output = magnitude_i;
}
Else{
    output = magnitude_i – envelope decay
},
``` where $magnitude_i$ is the current output from magnitude function 576, $magnitude_{i-1}$ is the preceding output from magnitude function 576, and envelope decay is a programmable decay value used by envelope detector 578. The resulting output of envelope detector 578 is provided to a normalizing circuit 580. Normalizing circuit 580 operates to normalize the value from envelope detector 578 to one. The output of normalizing circuit 580 provides a probability where one is equivalent to a high probability and other values down to zero correspond to respectively lower probabilities. The output of normalizing circuit 580 is provided to a low pass filter 582 that in turn provides a low pass filtered signal 584.

Data samples 522 are provided in parallel to a delay circuit 532 and a high pass filter 534. In some embodiments of the present invention, high pass filter 534 is a thirty-two bit MA filter as are known in the art. Based upon the disclosure provided herein, one of ordinary skill in the art will recognize a variety of high pass filters that may be used in relation to different embodiments of the present invention. Delay circuit 532 delays the received signal by a time period corresponding to the time required to pass through high pass filter 534. A multiplexer 536 selects either the output of high pass filter 534 or the output of delay circuit 532 based upon a select input 538. The selected output from multiplexer 536 is provided to a delay circuit 540. Delay circuit 540 provides a delayed output 542 that is delayed in time by an amount corresponding to the time used by MAP detector circuit 550 and partial response target filter 554. Said another way, delay circuit 540 operates to align delayed output 542 with partial response output 557 (i.e., to assure that each output is derived from the same data samples 522). Multiplier circuit 544 multiplies delayed output 542 by partial response output 557 to yield a multiplication product output 546. Product output 546 is provided to a low pass filter 548 that in turn provides a low pass filtered signal 562. Low pass filtered signal 562 is divided by low pass filtered signal 564 by a division function 566. Division function 566 provides a division product 568.

Division product 568 is multiplied by a low pass filtered signal 584 using a multiplier circuit 586. A multiplication product 595 from multiplier circuit 586 is compared with a threshold 588 using a comparator 590. Where multiplication product 595 is less than threshold 588, a defect flag 592 is asserted. Otherwise, defect flag 592 remains de-asserted.

In operation, input signal 505 is received from, for example, a read/write head assembly (not shown) that is disposed in relation to a storage medium (also not shown). Input signal is filtered and/or amplified by front end processing circuit 507, and the resulting output is converted to digital samples 513 by an analog to digital converter 511. Data samples 522 are generated by digitally filtering digital samples 513. Data samples 522 may be high pass filtered to remove any DC offset depending upon the assertion level of select input 538. In some cases, a defective region of a storage medium produces data samples 522 that exhibit a substantial DC offset that can be removed by high pass filter 534. In other cases, a defective region of a storage medium produces data samples 522 that are attenuated, but symmetric around a DC offset that is common to signals from non-defective regions. Multiplexer 536 allows for selection between unmodified data samples 522 or a high pass filtered version of data samples 522 depending upon a user's preference. In some cases, the output of multiplexer 536 will exhibit a relatively large amplitude for signals derived from a non-defective region of the storage medium, and a relatively small amplitude for signals derived from a defective region of the storage medium.

MAP data detector 550 performs a maximum a posteriori data detection on data samples 522 that produces hard output 552 and soft output 572. Hard outputs 552 are PR filtered by partial response target filter 554, with the results being squared by squaring function 556. The squared result exhibits a strong correlation to product output 546 where the original signal is derived from a non-defective region. In addition, output 562 exhibits a strong correlation to output 564 where the original signal is derived from a non-defective region. The correlation is substantially less when the samples come from a defective region, but the amplitude of both product output 546 output and the squared result is decreased where the samples come from defective regions. Because of the correlation, division product 568 should be approximately one for non-defective regions, but is substantially less than one for defective regions. As such, division product 568 can be used as an indicator of a media defect on the storage medium.

Division product 568 is further refined by multiplying it with processed soft input 572. In particular, soft input 572 is normalized to one with a value of one representing the highest probability and zero representing the lowest. For data derived from non-defective regions, soft input 572 is generally high due to a high signal to noise ratio. In contrast, for data derived from defective regions, soft input 572 is generally low due to a low signal to noise ratio. By multiplying division product 568 by the processed soft data 572, the contrast between data derived from a defective region and from a non-defective region is enhanced. This allows, among other things, for the detection of defective regions that exhibit only small reductions in signal amplitude compared with non-defective regions.

It should be noted that a number of variations of media defect detector 500 are possible in accordance with different embodiments of the present invention. For example, in some embodiments, partial response target filter 574 may be eliminated. Based upon the disclosure provided herein, one of ordinary skill in the art will recognize other modifications that may be made.

Figure 6:
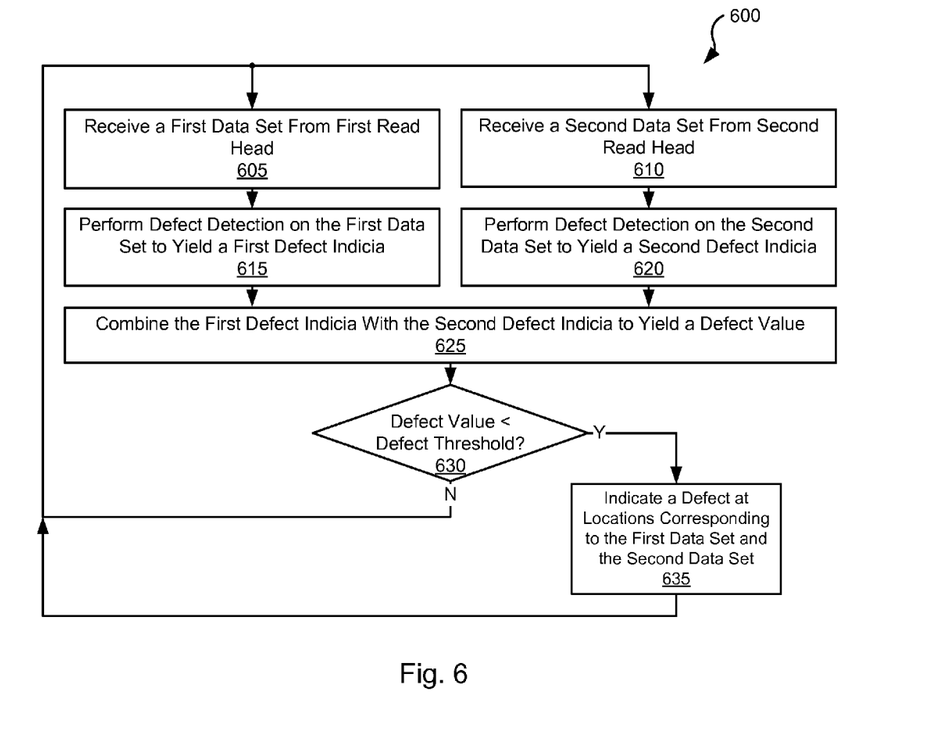
FIG. 6 is a flow diagram showing a method in accordance with some embodiments for detecting media defects using information from multiple tracks.

Turning to FIG. 6, a flow diagram 600 shows a method in accordance with some embodiments for detecting media defects using information from multiple tracks. Following flow diagram 600, a first data set is received from a first read head (block 605). A media defect detection algorithm is applied to each element of the first data set to yield a first defect indicia (block 615). This first defect indicia corresponds to a likelihood that a defect has been found on the storage medium at a location corresponding to the processed element of the first data set. In one particular embodiment of the present invention, the first defect indicia includes two output values identified as division product 568 and low pass filtered signal 584 on the circuit of FIG. 5. The first defect indicia is for a location on a first track over which the first read head is disposed.

In parallel, a second data set is received from a second read head (block 610). A media defect detection algorithm is applied to each element of the second data set to yield a second defect indicia (block 620). This second defect indicia corresponds to a likelihood that a defect has been found on the storage medium at a location corresponding to the processed element of the second data set. In one particular embodiment of the present invention, the second defect indicia includes two output values identified as division product 568 and low pass filtered signal 584 on the circuit of FIG. 5. The second defect indicia is for a location on a second track over which the second read head is disposed.

The first defect indicia and the second defect indicia are combined to yield a defect value (block 625). In one particular embodiment this includes multiplying the division product of the first defect indicia by the division product of the second defect indicia to yield a first product; and multiplying the low pass filtered signal of the first defect indicia, the low pass filtered signal of the second defect indicia, and a media defect threshold to yield a second product.

It is determined whether the defect value is less than a threshold value (block 630). Using the particular implementation discussed above, determining whether the defect value is less than a threshold value may include applying the previously discussed first product and second product to a data or threshold slicer circuit. Where the defect value is not less than the threshold value (block 630), no media defect is indicated. Alternatively, where the defect value is less than the threshold value (block 630), a media defect is indicated for both the location on a first track over which the first read head is disposed and a second track over which the second read head is disposed (block 635).

Figure 7:
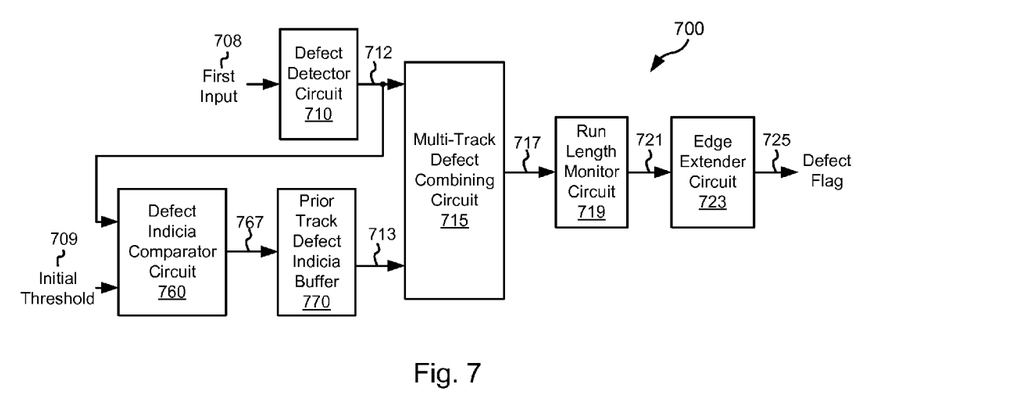
FIG. 7 depicts another a particular implementation of a multi-track defect detection circuit in accordance with various embodiments of the present invention.

Turning to FIG. 7, another a particular implementation of a multi-track defect detection circuit 700 is shown in accordance with various embodiments of the present invention. Multi-track defect detection circuit 700 includes a defect detector circuit 710 that receives a first input 708. First input 708 is derived from a read head (not shown) disposed over a track of a storage medium (not shown). Media defect detector circuit 710 applies a medium defect detection algorithm to the information derived from the first track to yield a defect indicia 712 for the current track. Defect indicia 712 is indicative of a likelihood of a defect on the storage medium at the location to which first input 708 corresponds.

Defect indicia 712 is provided to a defect indicia comparator circuit 760 where it is compared with an initial threshold 709. Initial threshold 709 may be either fixed or user programmable, and is a value corresponding to where a defect on the storage medium is more likely than not. Where defect indicia 712 is less than initial threshold 709 indicating a reasonable possibility of a defect at the location on the storage medium, an initial defect signal 767 is asserted. Initial defect signal 767 may include, for example, the value of defect indicia 712. Initial defect signal 767 is stored by a prior track defect indicia buffer 770 along with a location indicator (i.e., a location along the current track corresponding to defect indicia 712). Alternatively, where initial defect signal 767 is not asserted, no value is transferred and no buffering is performed by prior track defect indicia buffer 770. Thus, prior track defect indicia buffer 770 only stores data corresponding to locations exhibiting a reasonable likelihood of a defect. Prior track defect indicia buffer 770 provides a defect indicia 713 for a prior track.

The location of defect indicia 712 and defect indicia 713 correspond to substantially the same location on two different tracks, a current track (defect indicia 712) and a prior track (defect indicia 713). Thus, using FIG. 2 as an example, defect indicia 712 may correspond to a location A on track 220 and defect indicia 713 corresponds to a location B on track 225. Again, as with the circuit described above in relation to FIG. 3, any circuit known in the art for detecting a media defect based upon information received from a given track on a storage medium may be used to implement defect detector circuit 710. Based upon the disclosure provided herein, one of ordinary skill in the art will recognize a variety of different media defect detector circuits that may be used in relation to different embodiments of the present invention.

Defect indicia 712 is of similar type to defect indicia 713. Defect indicia 712, 713 are provided to a multi-track defect combining circuit 715. Multi-track defect combining circuit 715. Where defect indicia 712 and defect indicia 713 each includes two parts similar to that discussed above in relation to FIG. 4, multi-track defect combining circuit 715 may be implemented similar to multi-track defect combining circuit 490. Multi-track defect combining circuit 715 combines defect indicia 712 with defect indicia 713 to yield a combined defect value. Multi-track defect combining circuit 715 compares the combined defect value with a media defect threshold 790. In some cases, media defect threshold 790 may be user programmable. In other cases, media defect threshold 790 is fixed. Where the combined defect value is less than media defect threshold 790, multi-track defect combining circuit 715 asserts a defect flag 717.

Defect flag 717 is provided to a run length monitor circuit 719 that requires assertion of defect flag 717 for a programmable threshold number of cycles before a defect is indicated. Once a defect is indicated by run length monitor 719 as a filtered defect output 721, an edge extender circuit 723 marks the beginning and end of a corresponding defective region using a programmable right extension value and a programmable left extension value with the resulting edge extended defect flag 725 being provided as an output. Run length monitor 719 and edge extender circuit 723 may be implemented similar to that disclosed in U.S. Pat. No. 7,849,385 entitled "Systems and Methods for Media Defect Detection Utilizing Correlated DFIR and LLR Data", and filed Apr. 29, 2008 by Tan et al. The entirety of the aforementioned reference was previously incorporated herein by reference for all purposes.

Figure 8:
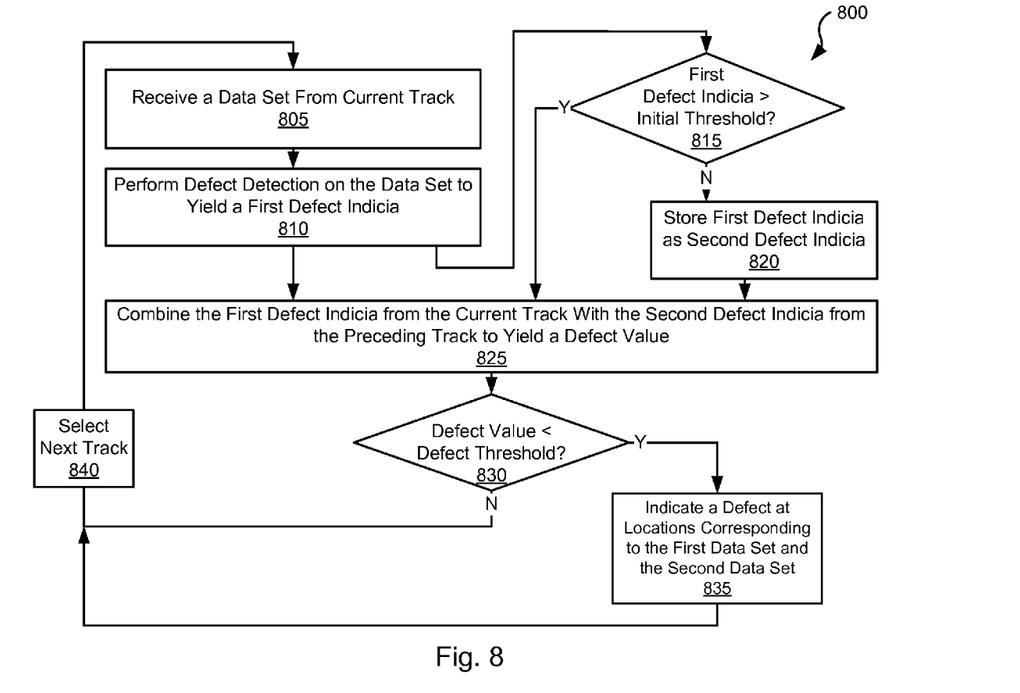
FIG. 8 is a flow diagram showing another method in accordance with one or more embodiments for detecting media defects using information from multiple tracks.

Turning to FIG. 8, a flow diagram 800 shows a method in accordance with one or more embodiments for detecting media defects using information from multiple tracks. Following flow diagram 800, a data set is received from a current track over which a read head is disposed (block 805). A media defect detection algorithm is applied to each element of the received data set to yield a first defect indicia (block 810). This first defect indicia corresponds to a likelihood that a defect has been found on the storage medium at a location on the current track corresponding to the processed element of the received data set. In one particular embodiment of the present invention, the first defect indicia includes two output values identified as division product 568 and low pass filtered signal 584 on the circuit of FIG. 5.

It is determined whether the first defect indicia is greater than an initial threshold (block 815). Where the first defect indicia includes two output values identified as division product 568 and low pass filtered signal 584 on the circuit of FIG. 5, the two output values may be multiplied together with the product being compared with the initial threshold. Where the first defect indicia is less than the initial threshold (block 815), there is a heightened probability of a media defect at the location. In such a case (block 815), the first defect indicia is stored as a second defect indicia (block 820). Otherwise, the second defect indicia is a zero value. In either case, the first defect indicia for the current track and the second defect indicia from the preceding track are combined to yield a defect value (block 825). This may include multiplying the first defect indicia for the current track and the second defect indicia from the preceding track to yield the defect value.

It is determined whether the defect value is less than a threshold value (block 830). Using the particular implementation discussed above, determining whether the defect value is less than a threshold value may include applying the previously discussed first product and second product to a data or threshold slicer circuit. Where the defect value is not less than the threshold value (block 830), no media defect is indicated. Alternatively, where the defect value is less than the threshold value (block 830), a media defect is indicated for both the location on a first track over which the first read head is disposed and a second track over which the second read head is disposed (block 835). In either case, the next track is selected as the current track, and the current track becomes the previous track (block 840).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would no longer be a circuit. In other cases, the one part of a given system, block or circuit may be implemented in software or firmware, while other parts are implemented in hardware.

In conclusion, the invention provides novel systems, devices, methods and arrangements for out of order data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A media defect detection system, the system comprising:
a media defect detector circuit operable to:
generate a first defect indicia for a location on a first track of a storage medium, wherein the first defect indicia includes a first low pass filtered value generated based upon data from the first track, and
generate a second defect indicia for a location on a second track of the storage medium, wherein the second defect indicia includes a second low pass filtered value generated based upon data from the second track, and wherein the location on the second track corresponds to the location on the first track; and
a multi-track defect combining circuit operable to generate a media defect signal based upon both the first defect indicia and the second defect indicia, wherein the multi-track defect combining circuit includes a multiplier circuit operable to multiply the first low pass filtered value and the second low pass filtered value to yield an interim product.

2. The system of claim 1, wherein the media defect detector circuit includes:
a first defect detector circuit operable to: receive data from the first track, and generate the first defect indicia; and
a second defect detector circuit operable to: receive data from the second track, and generate the second defect indicia.

3. The system of claim 2, wherein the first defect detector circuit is separate and identical to the second defect detector circuit.

4. The system of claim 1, wherein the first defect indicia further includes a first division product generated based upon data from the first track; and wherein the second defect indicia further includes a second division product generated based upon data from the second track.

5. The system of claim 4, wherein the multiplier circuit is a second multiplier circuit and the interim product is a second product, and wherein the multi-track defect combining circuit further includes a first multiplier circuit operable to multiply the first division product and the second division product to yield a first product.

6. The system of claim 5, wherein the second multiplier circuit is further operable to multiply by a media defect threshold to yield the second product; and wherein the multi-track defect combining circuit includes a slicer circuit operable to assert the media defect signal based upon a combination of the first product and the second product.

7. The system of claim 6, wherein the media defect threshold is user programmable.

8. The system of claim 1, wherein the first defect indicia is generated in parallel to the second defect indicia.

9. The system of claim 1, wherein the first defect indicia is generated at a time prior to generation of the second defect indicia.

10. The system of claim 1, wherein the system is implemented as part of a storage device, and wherein the storage device includes the storage medium.

11. The system of claim 10, wherein the storage device further includes a read/write head assembly disposed in relation to the storage medium such that a first read head accesses data from the first track in parallel to a second read head accessing data from the second track.

12. The system of claim 10, wherein the storage device further includes a read/write head assembly disposed in relation to the storage medium such that a read head accesses data from the first track prior to accessing data from the second track.

13. The system of claim 1, wherein the system is implemented as part of an integrated circuit.

14. A method for identifying media defects on a storage medium, the method comprising:
accessing a first data set from a first track of a storage medium;
accessing a second data set from a second track on the storage medium;
generating a first defect indicia for a location on the first track based upon the first data set, wherein the first defect indicia includes a first division product generated based upon data from the first track;
generating a second defect indicia for a location on the second track based upon the second data set, wherein the second defect indicia includes a second division product generated based upon data from the second track, and wherein the location on the second track corresponds to the location on the on the first track; and
generating a media defect signal based upon both the first defect indicia and the second defect indicia, wherein generating the media defect signal includes multiplying the first division product and the second division product to yield an interim product.

15. The method of claim 14, wherein the method further comprises:
providing a first defect detector circuit operable to: receive the first data set, and generate the first defect indicia; and
providing a second defect detector circuit operable to: receive the second data set, and generate the second defect indicia.

16. The method of claim 15, wherein the first defect detector circuit is separate and identical to the second defect detector circuit.

17. The method of claim 14, wherein the first defect indicia further includes a low pass filtered value generated based upon data from the first track; and wherein the second defect indicia includes a second low pass filtered value generated based upon data from the second track.

18. The method of claim 17, wherein the interim product is a first product, the method further comprising:
multiplying the first low pass filtered value and the second low pass filtered value to yield a second product.

19. The method of claim 18, the method further comprising:
multiplying the first low pass filtered value, the second low pass filtered value, and a media defect threshold to yield the second product; and
combining the first product with the second product using a data slicer circuit to yield the media defect signal.

20. A media defect detection system, the system comprising:
a storage medium including at least a first track and a second track;

a means for:
- generating a first defect indicia for a location on the first track, wherein the first defect indicia includes a first division product generated based upon data from the first track, and
- generating a second defect indicia for a location on the second track, wherein the second defect indicia includes a second division product generated based upon data from the second track, and wherein the location on the second track corresponds to the location on the first track; and a means for generating a media defect signal based upon both the first defect indicia and the second defect indicia, wherein the means for generating a media defect signal based upon both the first defect indicia and the second defect indicia includes a multiplier circuit operable to multiply the first division product and the second division product to yield a product.

\* \* \* \* \*